United States Patent
Kim (10) Patent No.: US 7,672,697 B2
(45) Date of Patent: Mar. 2, 2010

(54) MOBILE TERMINAL HAVING A DOUBLE ROTATION STRUCTURE

(75) Inventor: Moon-Young Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 102 days.

(21) Appl. No.: 11/021,227

(22) Filed: Dec. 23, 2004

(65) Prior Publication Data

US 2005/0153679 A1  Jul. 14, 2005

(30) Foreign Application Priority Data

Dec. 26, 2003  (KR) .................. 10-2003-0097981

(51) Int. Cl.
*H04M 1/00* (2006.01)

(52) U.S. Cl. .............. 455/575.3; 361/730; 361/752; 361/755; 379/433.11; 379/433.13; 455/575.1

(58) Field of Classification Search .......... 455/575.1, 455/575.3; 348/333.01, 333.06–333.12; 361/730, 752, 755; 379/433.11, 433.13
See application file for complete search history.

(56) References Cited

U.S. PATENT DOCUMENTS

| | | | | |
|---|---|---|---|---|
| 6,941,618 | B2* | 9/2005 | Kim .................. | 16/337 |
| 7,200,224 | B2* | 4/2007 | Park et al. .......... | 379/433.13 |
| 2001/0004269 | A1 | 6/2001 | Shibata et al. | |
| 2002/0187818 | A1* | 12/2002 | Kang ................ | 455/575 |
| 2003/0109232 | A1 | 6/2003 | Park et al. | |
| 2003/0125079 | A1* | 7/2003 | Park et al. ........ | 455/556 |
| 2004/0137970 | A1* | 7/2004 | Han .................. | 455/575.3 |
| 2004/0224729 | A1* | 11/2004 | Watanabe et al. ... | 455/575.3 |
| 2005/0079897 | A1* | 4/2005 | Nishijima et al. .... | 455/575.1 |

FOREIGN PATENT DOCUMENTS

| | | |
|---|---|---|
| CN | 1323150 | 11/2001 |
| EP | 0 898 405 A2 | 2/1999 |
| EP | 0 898 405 A3 | 10/2002 |
| EP | 1 267 576 A2 | 12/2002 |
| GB | 2 387 063 A | 10/2003 |
| JP | 2001298516 | 10/2001 |
| JP | 2004-NI312476 | * 4/2004 |
| WO | WO 02/091604 A2 | 11/2002 |

OTHER PUBLICATIONS

Nishijima et al., Foldable Portable Information Terminal, Apr. 11, 2004, NEC Corp., Paragraphs [0019] and [0021]-[0026].*

* cited by examiner

*Primary Examiner*—Patrick N Edouard
*Assistant Examiner*—Shantell Heiber
(74) *Attorney, Agent, or Firm*—Lee, Hong, Degerman, Kang & Waimey (57) ABSTRACT

An apparatus is disclosed for a double rotation structure mobile terminal. The mobile terminal comprising a main body having a plurality of keys for inputting information and operating functions of the mobile terminal, and a folder having a display portion. A connection member is provided having a first connection portion rotatably coupled to the main body and a second connection portion integrally formed within the first connection portion and rotatably coupled to the folder. A locking connection member installed along a side of the main body for selectively controlling rotation of the connection member.

16 Claims, 7 Drawing Sheets

MOBILE TERMINAL HAVING A DOUBLE ROTATION STRUCTURE

CROSS-REFERENCE TO RELATED APPLICATIONS

Pursuant to 35 U.S.C. §119(a), this application claims the benefit of earlier filing date and right of priority to Korean Application No. 10-2003-0097981, filed on Dec. 26, 2003, the contents of which are hereby incorporated by reference herein in its entirety.

BACKGROUND OF THE INVENTION

1. Field of the Invention

The present invention relates to a double rotation structure of a mobile terminal that is coupled between a main body and a folder for freely folding and unfolding the folder and adjusting position of a camera installed in the double rotation structure.

2. Description of the Related Art

A mobile terminal provides multimedia, internet access, voice transmission, and data transmission. The mobile terminal may have a camera for transmitting and/or receiving image shots from other mobile terminals.

Figure 1:
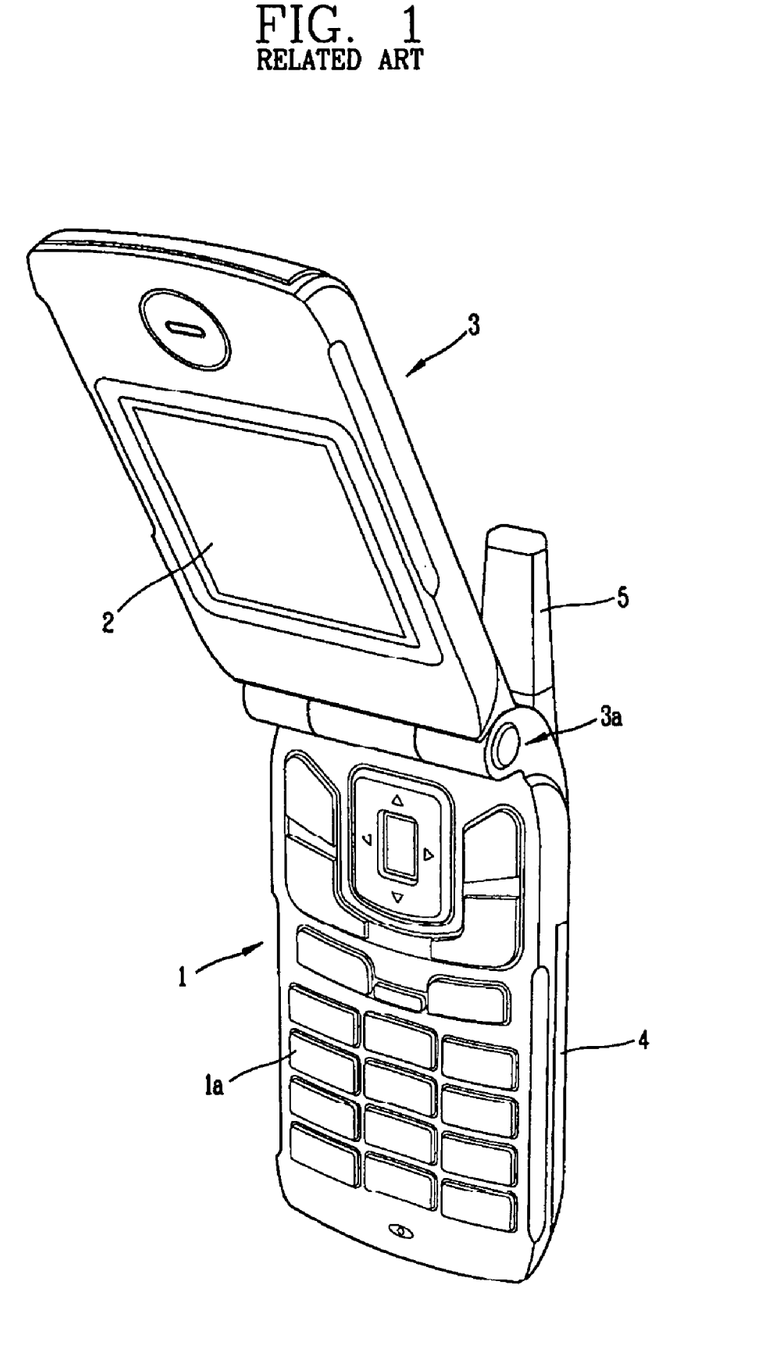
FIG. 1 is a perspective view illustrating a conventional folder type mobile terminal.
Figure 2:
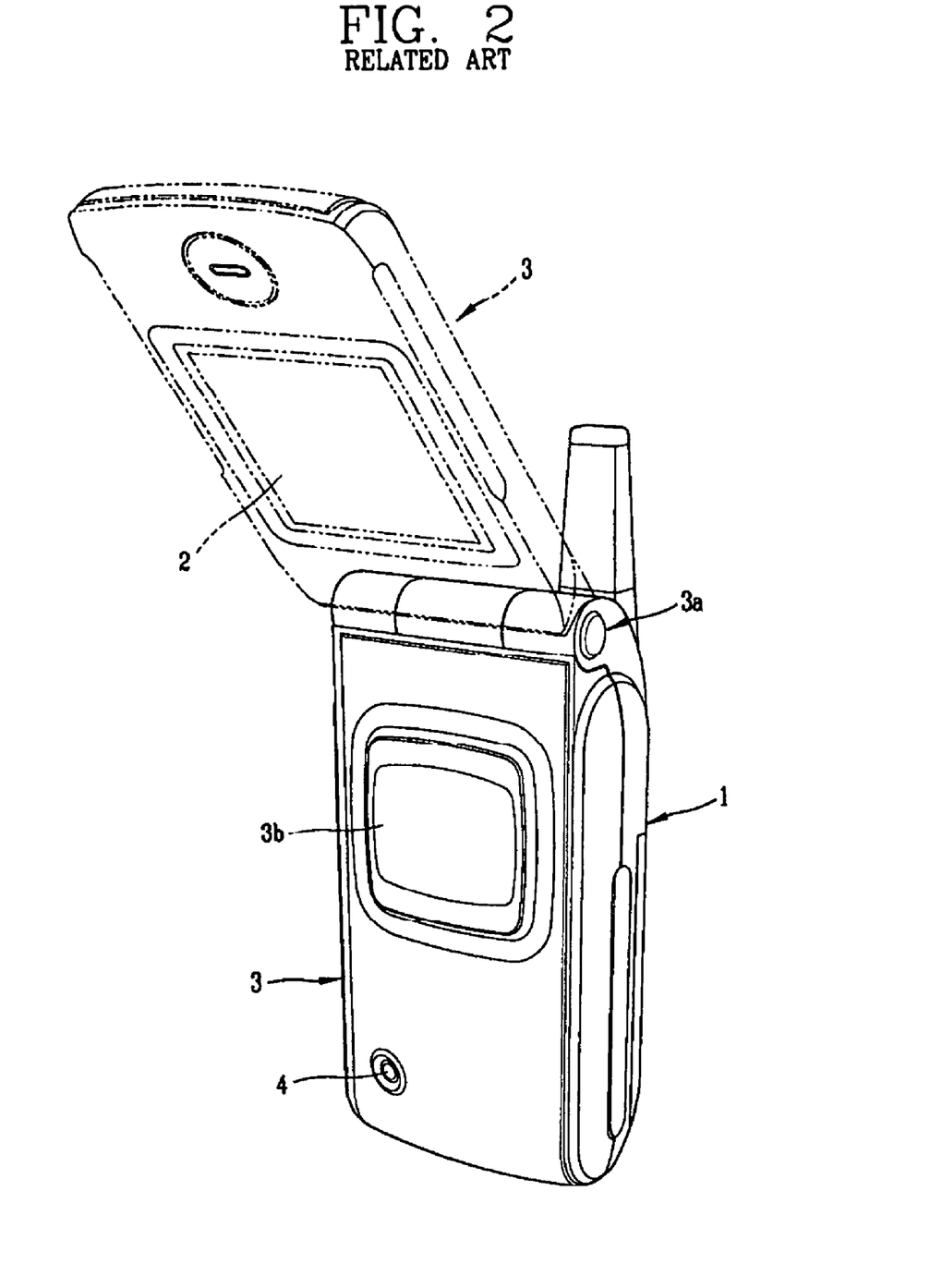
FIG. 2 is a diagram showing an operation of a conventional folder type mobile terminal.

FIG. 1 is a perspective view illustrating a conventional folder type mobile terminal. FIG. 2 is a diagram illustrating operation of a conventional folder type mobile terminal.

Referring to FIGS. 1 and 2, the conventional mobile terminal comprises a main body 1 having a plurality of buttons 1a and a folder 3 rotatably coupled to the main body 1 at one end of the main body 1 through a hinge portion 3a. The folder 3 opens or closes, i.e, folds or unfolds, with respect to a terminal main body 1 for protecting the terminal main body 1. The folder 3 has a main display portion 2 for viewing an image produced by a camera 4 mounted on the folder 3.

A sub-display portion 3b is installed on a front side of the folder 3 to view an image shot by the camera 4. The conventional mobile terminal has a voice transmission and reception mode and a camera mode.

During the voice transmission and reception mode, a user rotates the folder 3 to a specified angle centering about the hinged portion 3a for opening the folder 3 as shown in FIG. 2.

During the camera mode, a user positions the camera 4 and focuses an image of an object within the folder 3. The user shoots a picture of the object by pressing the buttons 1a. The user may view the image of the object through the main display portion 2.

During the camera mode, the user positions and focuses the camera 4 on the user by turning the folder 3. The user presses the button 1a to shoot a picture of the user. The user may view an image of the user through the sub-display portion 3b.

A conventional mobile terminal has a structure which limits an open angle of the folder between 120~180°. The limited open angle causes inconvenience for a user. In one instance, a user shooting a picture of himself or herself cannot view an image of the user on the main display. The user of the conventional mobile terminal is limited to viewing an image of the user on the sub-display portion 3b.

Therefore, there is a need for an apparatus that overcomes the above problems and provides advantages over other mobile terminals folding and unfolding structures.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one embodiment, a mobile terminal having a double rotation structure is disclosed. The mobile terminal comprises a main body having a plurality of keys for inputting information and operating functions of the mobile terminal and a folder having a display portion. A connection member is provided having a first connection portion rotatably coupled to the main body and a second connection portion integrally formed within the first connection portion and rotatably coupled to the folder. A locking connection member is installed along a side of the main body for selectively controlling rotation of the connection member.

The mobile terminal may further comprise a first groove formed on the main body for reception of the connection member. The mobile terminal may further comprise a second groove formed on the folder for reception of the connection member.

A first hinge axis is preferably formed on the main body for insertion into a first hinge groove formed on a first surface of the first connection portion. A second hinge axis is preferably formed on the folder for inserting into a second hinge groove formed on a first surface of the second connection portion.

A first auxiliary groove is preferably formed on a second surface of the first connection portion. A first mounting groove may be formed on a second surface of the main body. A second auxiliary groove is preferably formed on a second surface of the second connecting portion. A second mounting groove may be formed on a second surface of the folder.

The mobile terminal may further comprise a first auxiliary pin inserted in the first auxiliary groove and the first mounting groove and/or a second auxiliary pin inserted in the second auxiliary groove and the second mounting groove.

The main body is preferably rotatably installed and centered about the first hinge axis and the first auxiliary pin. The folder is preferably rotatably installed and centered about the second hinge axis and the second auxiliary pin.

The first connecting portion is preferably rotatably installed and centered about the first hinge axis and the first auxiliary pin. The second connecting portion is preferably rotatably installed and centered about the second hinge axis and the second auxiliary pin.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a double rotation structure of a mobile terminal that is coupled between a main body and a folder for freely folding and unfolding the folder and adjusting position of a camera installed in the double rotation structure.

Although the invention is illustrated with respect to a mobile terminal, it is contemplated that the invention may be utilized anywhere it is desired for repositioning electronic components within a mobile communication system for increasing a user ability to utilize the mobile terminal. Reference will now be made in detail to the preferred embodiments of the present invention, examples of which are illustrated in the accompanying drawings.

Figure 3:
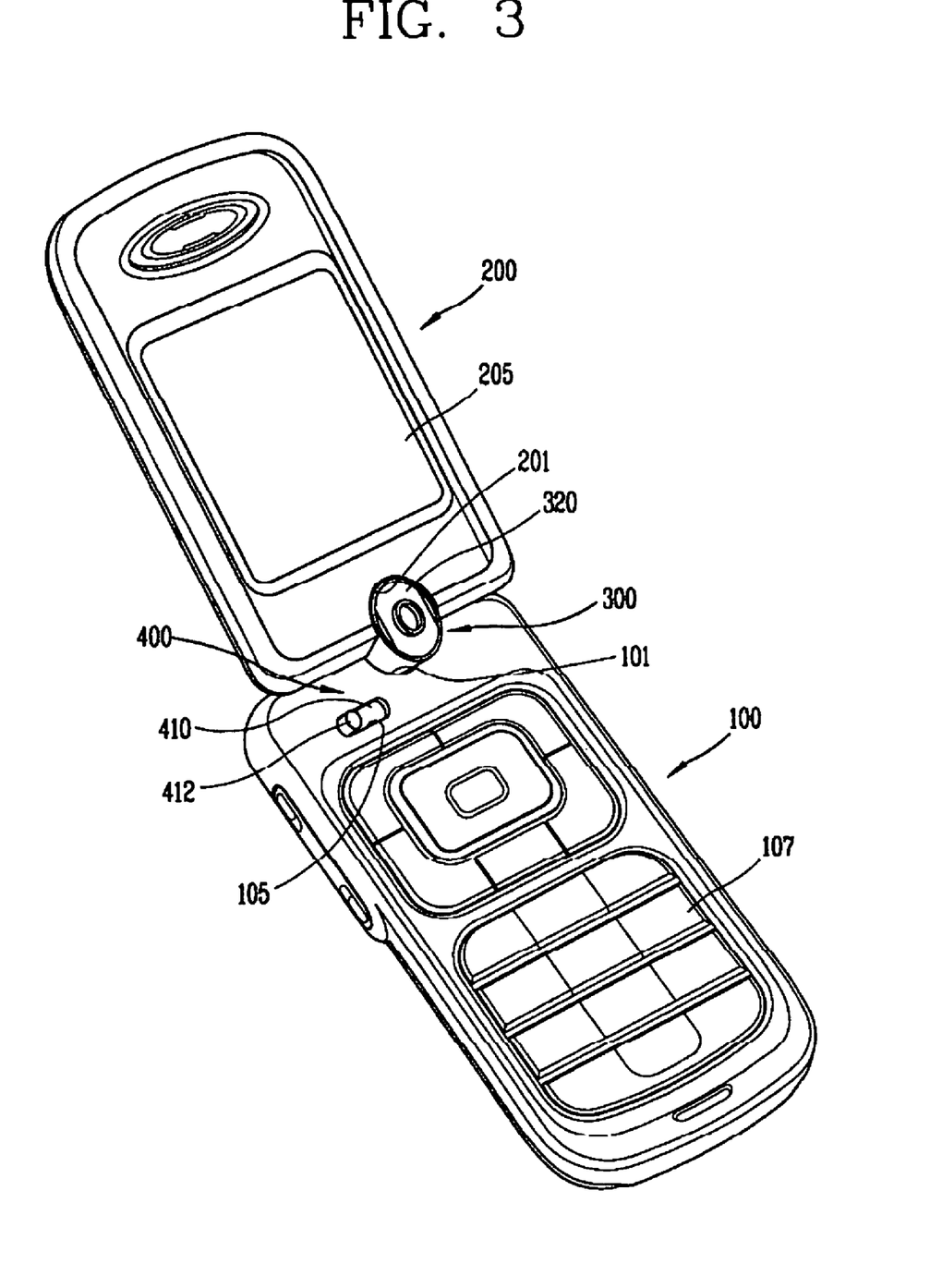
FIG. 3 is a perspective view illustrating a mobile terminal having a double rotation structure in accordance with the present invention.
Figure 4:
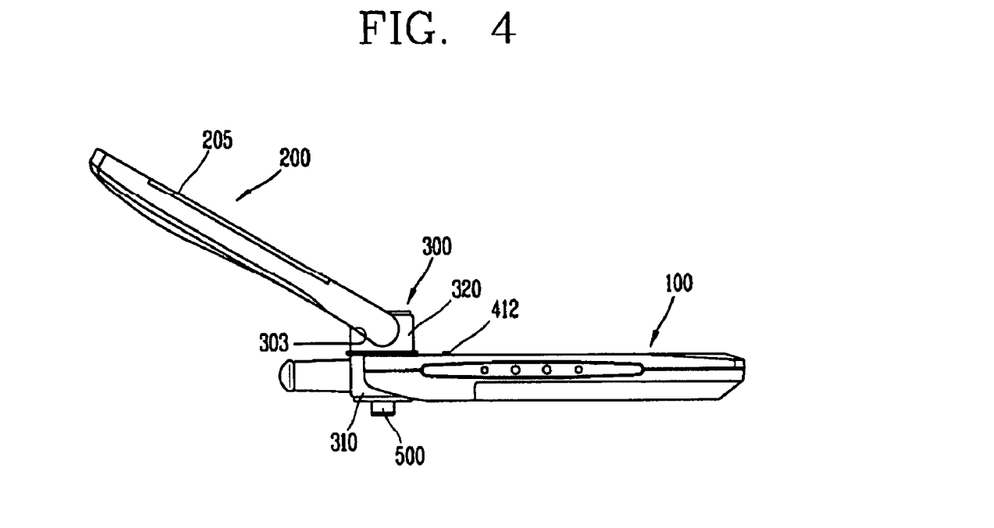
FIG. 4 is a side view of the mobile terminal shown in FIG. 3 of the present invention.

FIG. 3 is a perspective view and FIG. 4 is a side view illustrating a mobile terminal having a double rotation structure in accordance with the present invention.

The mobile terminal having a double rotation structure in accordance with the present invention provides a main body 100 having a plurality of keys 107 to input information and operate functions of the mobile terminal and a folder 200 having a display portion 205. A connection member 300 having a first connecting portion 310 with a camera 500 and a second connecting portion 320 integrally formed with the first connecting portion 310. The first connecting portion 310 is rotatably coupled to the main body 100 and the second connecting portion 320 is rotatably coupled to the folder 200. A connection member locking means 400 is installed at one side of the main body 100 to selectively control rotation of the connection member 300.

Figure 5:
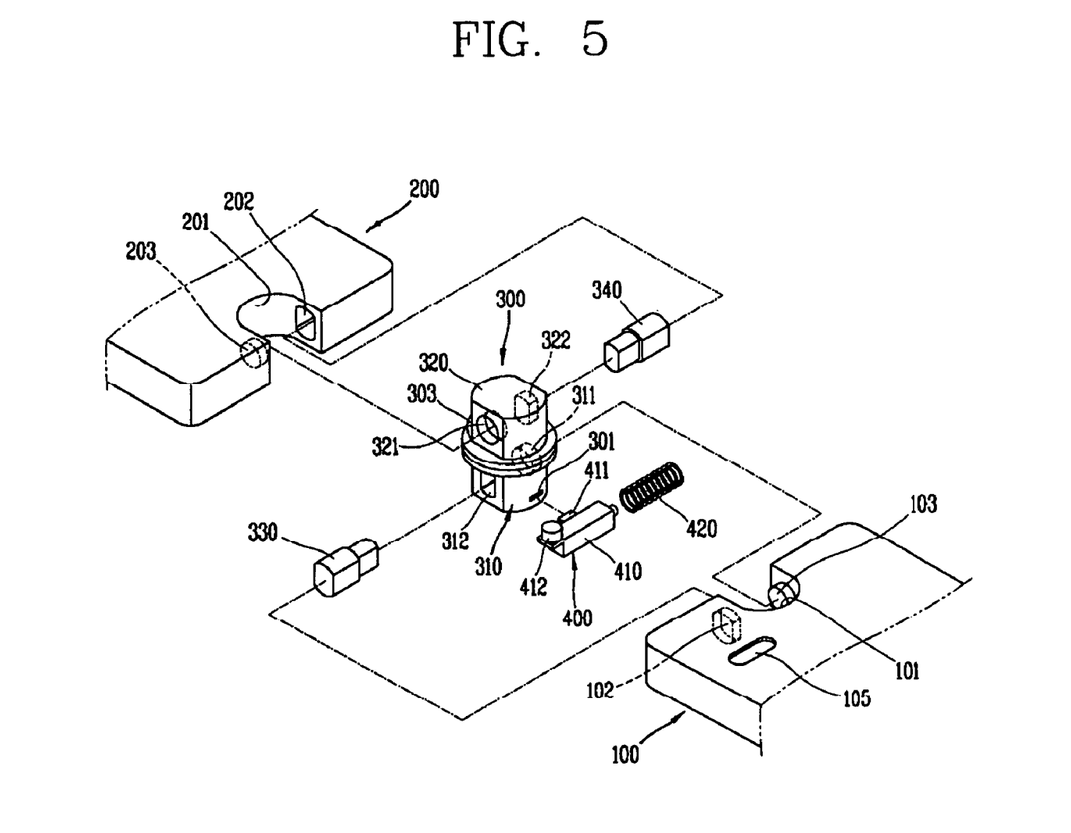
FIG. 5 is a disassembled perspective view showing main parts of the double rotation structure the mobile terminal depicted in FIGS. 3 and 4 in accordance with the present invention.

FIG. 5 is a disassembled perspective view showing main parts of the double rotation structure the mobile terminal depicted in FIGS. 3 and 4 in accordance with the present invention.

A first receiving groove 101 is formed on one side of the main body 100 for reception of the connection member 300. A second receiving groove 201 is formed on one side of the folder 200 for reception of the connection member 300.

A first hinge groove 311 is formed on one surface of the first connecting portion 310. A first hinge axis 103 is formed at one surface of the main body 100, in particular, along an inner circumferential surface of the first receiving groove 101 for insertion into the first hinge groove 311.

A second hinge groove 321 is formed on one surface of the second connecting portion 320, which corresponds with the first hinge groove 311. A second hinge axis 203 is formed at one surface of the folder 200, for example along an inner circumferential surface of the second receiving groove 201, for insertion into the second hinge groove 321.

The first hinge groove 311 and the second hinge groove 321 of the connection member 300 cross each other, and the first hinge axis 103 and the second hinge axis 203 cross each other.

A first auxiliary groove 312 is formed on the other side of the first connecting portion 310, and a first mounting groove 102 is formed at the other side of the main body 100. A first auxiliary pin 330 is inserted in the first auxiliary groove 312 and the first mounting groove 102. A second auxiliary groove 322 is formed on the other side of the second connecting portion 320, and a second mounting groove 202 is formed on the other side of the folder 200. A second auxiliary pin 340 inserts in the second auxiliary groove 322 and the second mounting groove 202.

Figure 6:
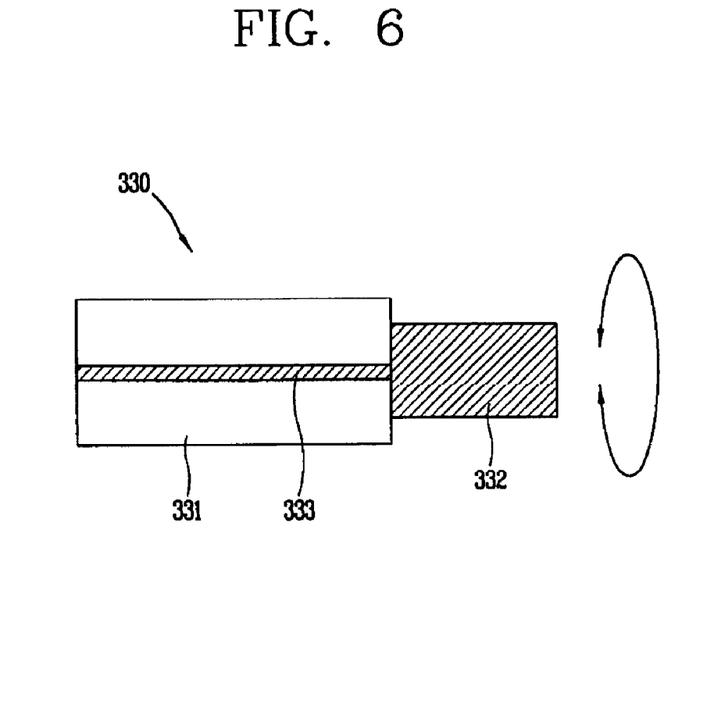
FIG. 6 is a cross-sectional view illustrating a first auxiliary pin of a mobile terminal having a double rotation structure in accordance with the present invention.

FIG. 6 is a side view showing a first auxiliary pin of the mobile terminal having a double rotation structure in accordance with the present invention.

Referring to FIG. 6, the first auxiliary pin 330 comprises a first fixed portion 331 inserted in the first mounting groove 102 and a first rotating portion 332 coupled rotatably and axially to the first fixing portion 331 for insertion into the first auxiliary groove 312.

Figure 7:
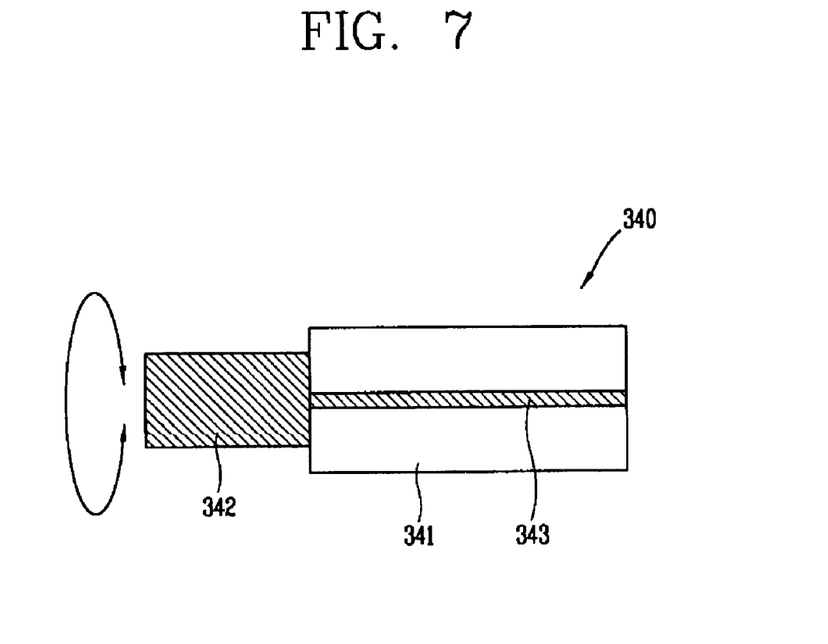
FIG. 7 is a cross-sectional view illustrating a second auxiliary pin of a mobile terminal having a double rotation structure in accordance with the present invention.

FIG. 7 is a cross-sectional view illustrating a second auxiliary pin of the mobile terminal having a double rotation structure in accordance with the present invention.

As shown in FIG. 7, the second auxiliary pin 340 provides a second fixed portion 431 inserted in the second mounting groove 202, and a second rotating portion 432 coupled rotatably and axially to the second fixed portion 431 for insertion into the second auxiliary groove 322.

The main body 100 is rotatably centered about the first hinge axis 103 and the first auxiliary pin 330. The folder 200 is rotatably centered about the second hinge axis 203 and the second auxiliary pin 340.

The main body 100 is rotatably installed centering around the first hinge axis 103 and the first auxiliary pin 330. The folder 200 is also rotatably installed centering around the second hinge axis 203 and the second auxiliary pin 340.

Figure 8:
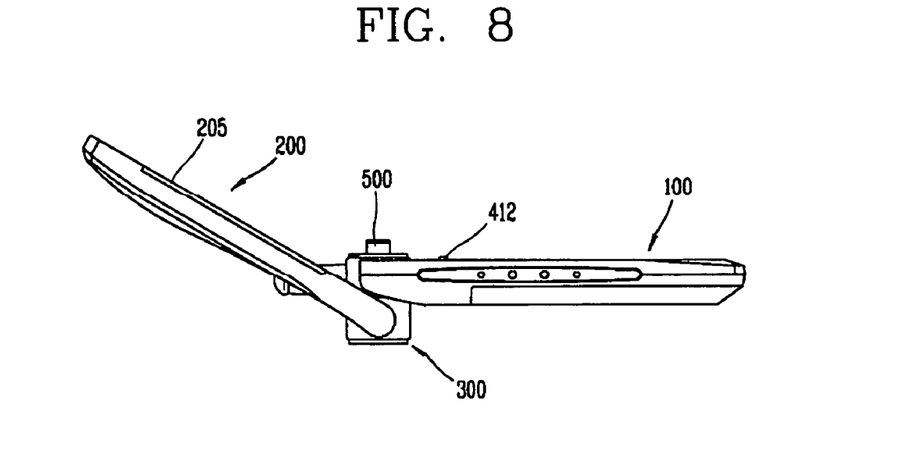
FIG. 8 is a side view illustrating a connection member having a double rotation structure in a rotated state in accordance with the present invention.

FIG. 8 is a side view illustrating a connection member having a double rotation structure in a rotated state in accordance with the present invention.

Referring to FIG. 8, the connection member 300 is rotatable a specified angle in a state that the main body 100 and the folder 200 are not rotated. A mobile terminal having a double rotation structure provides for the folder being rotated or the connection member being rotated while the folder remains stationary.

In the present invention double rotation structure, a user may freely adjust a direction of the camera 500 installed in the connection member 300 toward the user or an object allowing a user to conveniently shoot an image while watching the main display portion.

In a mobile terminal having the double rotation structure in accordance with the present invention, there is no need for moving the folder 200 and the main body 100 because the connection member 300 is rotated toward the camera 500 to face the user. To achieve these functions, the first connecting portion 310 is installed rotatably centered about the first hinge axis 103 and the first auxiliary pin 330, and the second connecting portion 320 is installed rotatably centered about the second hinge axis 203 and the second auxiliary pin 340.

Below is described the connection member locking means 400 utilized with the connection member 300 to prevent arbitrary movement of the folder 200 and main body 100.

The connection member locking means 400 secures the connection member 300 to prevent rotation during a voice transmission and reception mode. The connection member locking means 400 converts the connection member 300 into a rotatable state only when rotation of the connection member 300 is required, for example when a user desires to shoot a picture of himself or herself.

The connection member locking member 400 provides a slider 416 installed slidably in the main body 100 and having a locking projection 411 formed at one surface to be selectively inserted in a locking groove 301 placed in the connection member 300. A handgrip 412 is formed on the other surface. A spring 420 is installed adjacent to the slider 410 for flexibly moving the slider 410.

A slot 105 is formed at the upper surface of the main body 100, and the handgrip 412 is exposed out of the main body 100 through the slot 105.

A stopping jaw 303 is formed at a part of an outer circumferential surface of the second connecting portion 320 in the connection member 300 for allowing the opened angle of the folder 200 to be constant when the folder 200 is opened.

An operation of the mobile terminal having a double rotation structure is explained below.

During a voice transmission and reception mode, as shown in FIGS. 3 and 4, upon rotation of the folder 200 for opening at a specified angle centered about the connection member 300, a user talks over the phone with another user by using the buttons 107. In this exemplary example, the folder 200 is rotated centered about the first hinge axis 203 and the second auxiliary pin 340. When the folder 200 is opened, the folder 200 maintains a constant open angle using the stopping jaw 303. The stopping jaw 303 is preferably formed on part of the middle portion of the outer circumferential surface of the connection member 300. The user can conveniently talk over the phone with another user.

Referring to FIG. 4, during the camera mode, a user adjusts a position of the camera 500 to a desired object and shoots an image of the object by pressing the buttons 107. The user may observe the image that results through the display portion 205.

While a user shoots a picture of himself or herself, the user releases a locking state of the connection member locking means 400 to convert the connection member into a rotatable state.

In this rotatable state, as the folder 200 is being opened, the locking projection 411 of the slider 410 disengages from of the locking groove 301 by pushing toward the spring 420 with a knob 412 to maintain the rotatable state of the connection member 300. The first connecting portion 310 is rotated centering around the first hinge axis 103 and the first auxiliary pin 330. The second connecting portion 320 is rotated centered around the second hinge axis 203 and the second auxiliary pin 340. The direction of the camera 500 being installed, in this exemplary example, at a front surface of the first connecting portion 310 of the connection member 300 is rotated to face the user. The user shoots a picture of himself or herself by rotating the direction of the camera 500 without turning the folder 200 by 180°.

Figure 9:
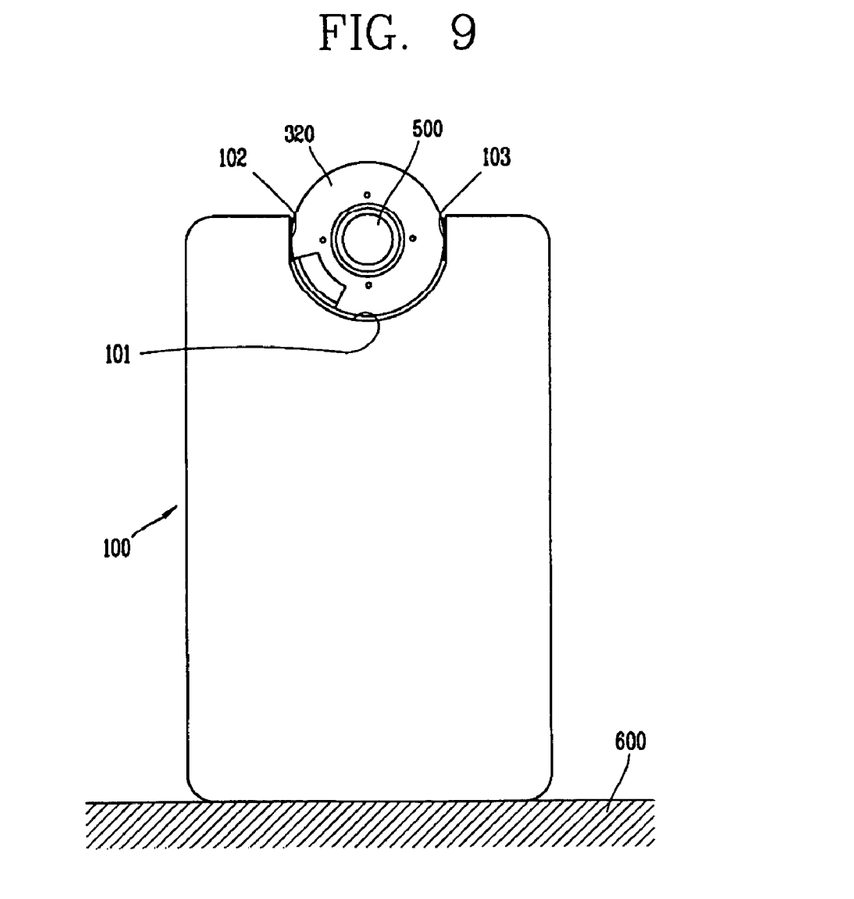
FIG. 9 is a front view illustrating a state that a mobile terminal having a double rotation structure is installed at right angles to a bottom surface in accordance with the present invention.
Figure 10:
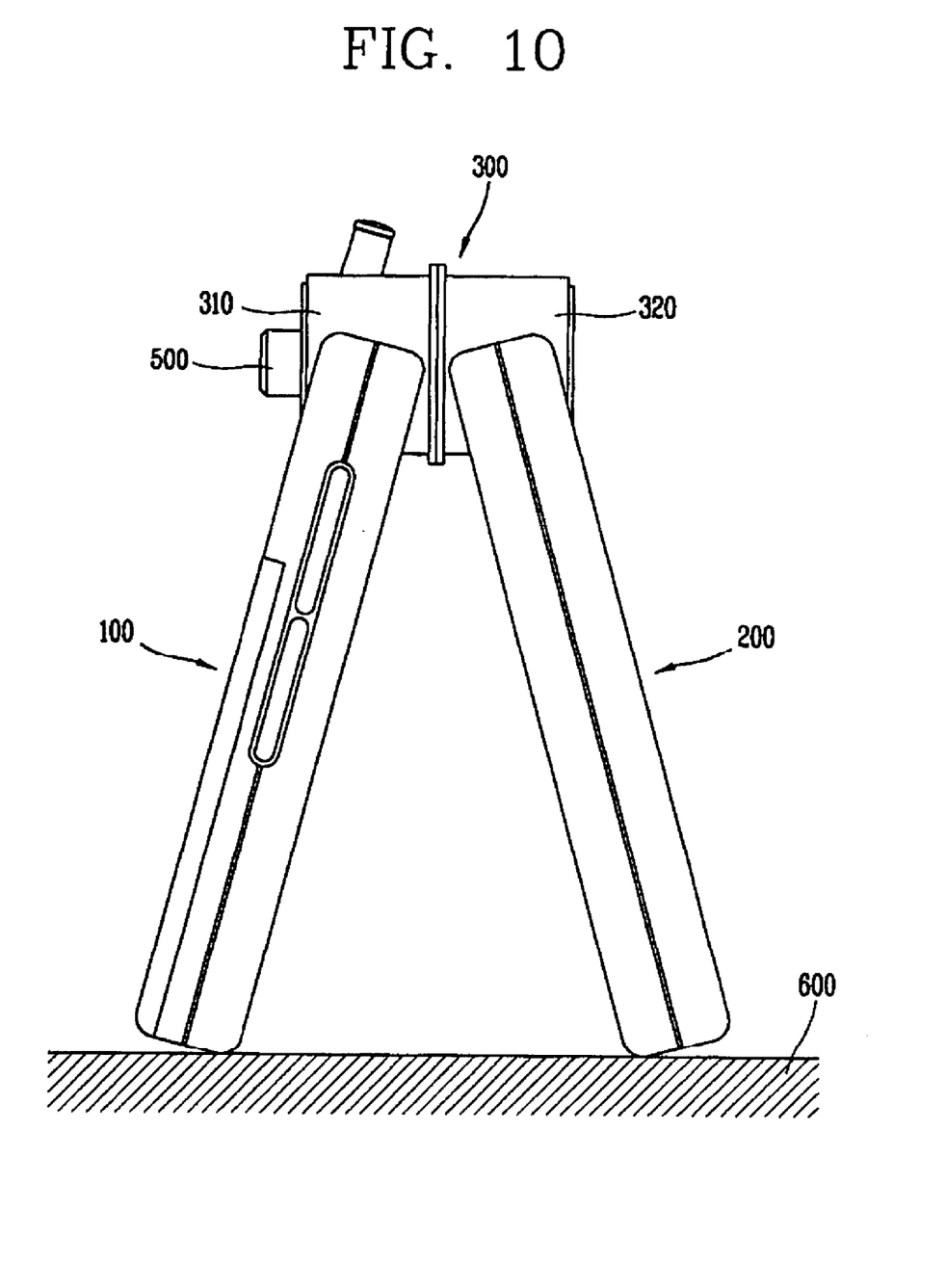
FIG. 10 is a side view of the state shown in FIG. 9 in accordance with the present invention.

FIG. 9 is a front view showing a state that the mobile terminal having the double rotation structure in accordance with the present invention is installed at right angles to the bottom surface. FIG. 10 is a side view of the state shown in FIG. 9 of the present invention.

Referring to FIGS. 9 and 10, when the mobile terminal is placed on a bottom surface 600 of indoor or a table, the position of camera 500 may be adjusted to face a subject (not shown), and thereby the user may shoot an image of the subject. The user may use the mobile terminal, without holding the terminal in his hands, by putting the terminal on the bottom surface 600 of indoor or the table. As a result, the user may conveniently shoot an image utilizing the folder 200 and the main body 100 similar to a tripod supporting a camera.

As stated above, the mobile terminal by adopting the double rotation structure of the present invention whereby the folder may be rotated and the connection member may also be rotated while the folder remains stationary. The double rotation feature permits the folder to be freely opened and closed. The connection member coupling to the main body to the folder allows the position of the camera installed at the connection member to be freely adjusted.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

Although the present invention is described in the context of a mobile terminal, the present invention may also be used in any wired or wireless communication systems using mobile devices, such as PDAs and laptop computers equipped with wired and wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

What is claimed is:

1. A mobile terminal having a double rotation structure, the terminal comprising:
    a main body having a plurality of keys for inputting information and operating functions of the mobile terminal;
    a folder having a display portion;
    a connection member having a first hinge portion rotatably coupled to the main body about a first axis and a second hinge portion, rotatably coupled to the folder about a second axis, the second hinge portion being integrally formed with the first hinge portion, wherein the second axis is parallel to the first axis;
    a first groove formed on the main body and configured to receive the connection member;
    a second groove formed on the folder and configured to receive the connection member;

a first hinge shaft formed on the main body and inserted into a first hinge groove formed on a first surface of the first hinge portion;

a second hinge shaft formed on the folder and inserted into a second hinge groove formed on a first surface of the second hinge portion; and a camera mounted on the connection member, wherein the connection member is configured to allow the folder to be in first and second open positions such that, when the folder moves from the first open position to the second open position, the connection member rotates by approximately 180 degrees with respect to the main body and the folder rotates with respect to the connection member such that the folder is substantially parallel with a plane of the folder in the first open position, and such that the camera faces opposite directions in the first and second open positions.

2. The mobile terminal of claim 1, further comprising a first auxiliary groove formed on a second surface of the first hinge portion and a first mounting groove formed on a second surface of the main body.

3. The mobile terminal of claim 2, further comprising a second auxiliary groove is formed on a second surface of the second hinge portion and a second mounting groove formed on a second surface of the folder.

4. The mobile terminal of claim 1, further comprising a first auxiliary pin inserted into the first auxiliary groove and the first mounting groove.

5. The mobile terminal of claim 4, further comprising a second auxiliary pin inserted into the second auxiliary groove and the second mounting groove.

6. The mobile terminal of claim 4, wherein the first auxiliary pin comprises a first fixed portion inserted into the first mounting groove, and a first rotating portion inserted into the first auxiliary groove for rotatably and axially coupling to the first fixed portion.

7. The mobile terminal of claim 5, wherein the second auxiliary pin comprises a second fixed portion inserted in the second mounting groove, and a second rotating portion inserted into the second auxiliary groove for rotatably and axially coupling to the second fixed portion.

8. The mobile terminal of claim 4, wherein the main body is rotatably installed and centered about the first hinge axis and the first auxiliary pin.

9. The mobile terminal of claim 5, wherein the folder is rotatably installed and centered about the second hinge axis and the second auxiliary pin.

10. The mobile terminal of claim 4, wherein the first hinge portion is rotatably installed and centered about the first hinge axis and the first auxiliary pin.

11. The mobile terminal of claim 5, wherein the second hinge portion is rotatably installed and centered about the second hinge axis and the second auxiliary pin.

12. The mobile terminal of claim 1, further comprising:
a locking connection member installed along a side of the main body, operated by a handgrip exposed onto the main body, and configured to selectively control rotation of the rotatable connection member relative to the main body or the folder body.

13. The mobile terminal of claim 12, wherein the locking connection member comprises:
a slider installed in the main body, having a locking projection formed on one surface of the main body, and being selectively inserted into a locking groove placed in the connection member and the handgrip formed on another surface of the main body.

14. The mobile terminal of claim 13, wherein the locking connection member further comprises:
a spring installed adjacent to the slider for flexibly moving within the slider.

15. The mobile terminal of claim 13, further comprising a slot formed on an upper surface of the main body, and the handgrip is exposed through the slot.

16. The mobile terminal of claim 1, further comprising a stopping jaw formed along an outer circumferential surface of the second hinge portion and configured to provide a constant opened angle of the opened folder.

* * * * *